(12) United States Patent
Chung et al.

(10) Patent No.: US 8,969,458 B2
(45) Date of Patent: Mar. 3, 2015

(54) TRANSPARENT HEAT SHIELDING COMPOSITION

(71) Applicant: Industrial Technology Research Institute, Hsinchu (TW)

(72) Inventors: Pao-Tang Chung, Hsinchu (TW); Sung-Jeng Jong, Hsinchu (TW); Jer-Young Chen, Hsinchu (TW); Yih-Her Chang, Hsinchu (TW); Huai-Kuang Fu, Hsinchu (TW); Ting-Ting Xiao, Hsinchu (TW)

(73) Assignee: Industrial Technology Research Institute, Chutung Township, Hsinchu County (TW)

( * ) Notice: Subject to any disclaimer, the term of this patent is extended or adjusted under 35 U.S.C. 154(b) by 0 days.

(21) Appl. No.: 13/914,224

(22) Filed: Jun. 10, 2013

(65) Prior Publication Data

US 2014/0187701 A1 Jul. 3, 2014

(30) Foreign Application Priority Data

Dec. 28, 2012 (TW) .............. 101150919 A (51) Int. Cl.
*C08K 3/22* (2006.01)
*C08L 23/06* (2006.01)

(52) U.S. Cl.
USPC ...................................................... 524/406

(58) Field of Classification Search
USPC ...................................................... 524/406
See application file for complete search history.

(56) References Cited

U.S. PATENT DOCUMENTS

| 4,952,433 | A | 8/1990 | Tezuka et al. |
| 2006/0008639 | A1 | 1/2006 | Kuno |
| 2007/0232763 | A1 | 10/2007 | Kulkarni et al. |
| 2011/0143116 | A1* | 6/2011 | Chung et al. .............. 428/220 |

FOREIGN PATENT DOCUMENTS

| CN | 102234395 A | 11/2011 |
| JP | 2008-214596 A | 9/2008 |
| JP | 2010220567 A | 10/2010 |
| TW | 200530132 B | 12/2007 |
| TW | 200948617 | 12/2009 |
| TW | 201121894 A1 | 7/2011 |
| TW | I346669 | 8/2011 |

OTHER PUBLICATIONS

Granqvist C.G., Electrochromic tungsten oxide films: Review of progress 1993-1998, Solar Energy Materials & Solar Cells, 2000, pp. 201-262.
Deepa M. et al., Influence of polyethylene glycol template on microstructure and electrochromic properties of tungsten oxide, Solar Energy Materials and Solar Cells, 2008, pp. 170-178.
Haworth B., Polyethylene Compounds Containg Mineral Fillers Modified by Acid Coatings. 1: Characterization and Processing, Polymer Engineering and Science, 2000, pp. 1953-1968.
Leitus G., Interplay of Cs concentration, dimensionality and superconductivity in CsxWO3, Physica C, 2002, pp. 321-329.
Dilara, P. A. et al., Degradation and Stabilization of Low-density Polyethylene Films used as Greenhouse Covering Materials, Journal of Agricultural Engineering Reseach, 2000, pp. 309-321.

* cited by examiner

*Primary Examiner* — Robert D. Harlan
(74) *Attorney, Agent, or Firm* — Muncy, Geissler, Olds & Lowe, P.C.

(57) ABSTRACT

Provided is a transparent heat shielding composition, which includes a thermoplastic resin material and a compound of formula (I)

$$M_xWO_{3-y}A_y \qquad (I),$$

wherein M is an alkali metal, W is tungsten, O is oxygen, A is halogen, $0<x\le1$ and $0<y\le0.5$.

10 Claims, 3 Drawing Sheets

TRANSPARENT HEAT SHIELDING COMPOSITION

CROSS-REFERENCE TO RELATED APPLICATIONS

This application is based on, and claims priority from, Taiwan Patent Application Serial No. 101150919, filed on Dec. 28, 2012. The entirety of the above-mentioned patent application is hereby incorporated by reference herein.

TECHNICAL FIELD

The present disclosure relates to a heat shielding composition.

BACKGROUND

General heat shielding film products are mostly resin materials added with dye, metal, mica, ATO, $LaB_6$ and the like. However, these heat shielding films have poor shielding performance against infrared light, and poor heat shielding performance. Further, these heat shielding films have poor weather resistance, and they also have the problem of color fading upon prolonged sun exposure. Additionally, for example, the heat shielding products of the multi-layered silver film have excellent heat shielding effects, but have poor stability in the air. Moreover, these products often have high fabrication costs and complex manufacturing process.

Conventional heat shielding products usually do not have both high light transmission and high heat shielding ability. For example, transparent oxide conductive materials such as antimony tin oxide ($SnO_2$:Sb, abbreviated as ATO) and indium tin oxide ($SnO_2$:In, abbreviated as ITO) usually need to be added into heat shielding products. Since the transparent oxide conductive materials have lower conductivity, the plasma wavelength of the transparent oxide conductive materials is greater than 1000 nm (these materials have a plasma wavelength of approximately 1000-2500 nm). Therefore, when these materials are added to the heat shielding film materials, although the visible light transmission rate of the heat shielding film is increased, its infrared rejection is often reduced by 50%. Further, the addition of the aforesaid materials also causes a reduction of heat shielding properties. In addition, although the heat shielding product having resin materials added with metals has 50% infrared rejection, the visible light transmission rate is only 50%. Moreover, the heat shielding film materials as added with tungsten oxide and an alkali metal have increased visible light transmission rate and insufficient infrared rejection. However, when the infrared rejection of these materials is increased, there is still the problem of reduced visible light transmission rate. Further, if $LaB_6$ having a plasma wavelength of 700 to 1100 nm is added to heat shielding film products, the heat shielding film product has better infrared rejection due to $LaB_6$ having higher conductivity, but there is still insufficient visible light transmission rate. Thus, it is clear that conventional heat shielding film products cannot have high transparency as well as high heat shielding effects. As such, there is a need to develop a heat shielding material with high light transmission rate, high heat shielding ability and high stability.

SUMMARY

A transparent heat shielding composition is provided. The transparent heat shielding composition includes a thermoplastic resin material and a compound of formula (I):

$$M_xWO_{3-y}A_y \qquad (I),$$

wherein M is an alkali metal, W is tungsten, O is oxygen, A is halogen, $0<x\leq1$ and $0<y\leq0.5$, and wherein the thermoplastic resin material is at least one selected from the group consisting of polyethylene (PE), ethylene vinyl acetate (EVA), poly (ethylene-ethylene vinyl acetate), polyvinylidene fluoride (PVDF), polytetratfluoroethene (PTFE), ethylene tetrafluoroethene (ETFE), polycarbonate (PC), polyvinyl chloride, (PVC), polypropylene (PP), polyvinyl alcohol (PVA), polyester and polyvinylidene chloride (PVDC).

DETAILED DESCRIPTION OF DISCLOSED EMBODIMENTS

Specific embodiments are provided below to illustrate the methods of implementing the present disclosure. Persons skilled in the art can easily understand the advantages and effects of the present disclosure according to the disclosure of the specification of the present disclosure. The present disclosure can also be used in combination with different implementation methods. The various details in the specification of the present disclosure can be based on different perspectives and applications without departing from the spirit of the present disclosure.

Unless stated in the specification, otherwise the expressions "a" and "the" in the specification and claims include a plurality of individuals.

Unless stated, otherwise the expression "or" in the specification and claims includes the definition of "and/or".

A transparent heat shielding composition comprises a thermoplastic resin material and a compound of formula (I) below:

$$M_xWO_{3-y}A_y \qquad (I),$$

wherein M is an alkali metal, W is tungsten, O is oxygen, A is halogen, and $0<x\leq1$ and $0<y\leq0.5$.

The compound of formula (I) contains tungsten oxide doped with an anion and a cation. In one embodiment, M is lithium (Li), sodium (Na), potassium (K), rubidium (Rb), caesium (Cs) or a combination thereof. In one embodiment, A is fluorine (F), chlorine (Cl), bromine (Br), iodine (I) or a combination thereof.

The amount of compound of formula (I) is 0.01 to 10 percent by weight (wt %) based on the total weight of the transparent heat shielding composition. In one embodiment, the amount of compound of formula (I) is 0.1 wt % to 10 wt % based on the total weight of the composition. In one embodiment, the amount of compound of formula (I) is 0.1 wt % to 5 wt % based on the total weight of the composition. The amount of compound of formula (I) may vary according to the required thickness of products.

In one embodiment, the compound of formula (I) has a plasma wavelength of 800 to 1000 nm. The compound of formula (I) has good conductivity and no absorption of visible light, and thus has high heat shielding effects as well as high light transmission.

The preparation method of compound of formula (I) is disclosed in Taiwan Patent Application No. 098143078, the entirety of which is incorporated by reference herein, or this compound can be prepared using methods that are similar to those described in the aforesaid Taiwan Patent Application.

The compound of formula (I) can be in, but not limited to, the form, for example, particles (this may also be referred to as powder form in the specification).

The transparent heat shielding composition may comprise one or more compounds of formula (I). In one embodiment, according to the requirement for visible light transmission rate and infrared rejection, the compound of formula (I) in the transparent heat shielding composition is modified. In one embodiment, the amount of compound of formula (I) may be modified according to the required thickness of the product having the transparent heat shielding composition.

The transparent heat shielding composition comprises a thermoplastic resin material and the compound of formula (I).

Therefore, the thermoplastic resin material of transparent heat shielding composition can be optionally selected. The thermoplastic resin material may be, but not limited to, polyethylene (PE), ethylene vinyl acetate (EVA), poly(ethylene-ethylene vinyl acetate), polyvinylidene fluoride (PVDF), polytetrafluoroethene (PTFE), ethylene tetrafluoroethene (ETFE), polycarbonate (PC), polyvinyl chloride (PVC), polypropylene (PP), polyvinyl alcohol (PVA), polyester, PVDC, or a combination thereof.

In one embodiment, the thermoplastic resin material is selected from the group consisting of PE, EVA, poly(ethylene-ethylene vinyl acetate), PVDF, PTFE, PC, PVC, PP, PVA, polyester, PVDC, and a combination thereof.

In one embodiment, the thermoplastic resin material is PE, EVA, poly(ethylene-ethylene vinyl acetate), PVDF, PTFE, PC, PVC, PP, PVA, polyester and PVDC, or a combination thereof of the aforementioned thermoplastic resin materials.

In one embodiment, the thermoplastic resin material is PE, EVA, poly(ethylene-ethylene vinyl acetate), PVDF, PTFE, PC, PVC, PP, PVA, polyester and PVDC, or a mixture of the aforesaid thermoplastic resin materials.

In one embodiment, the thermoplastic resin material is PE, EVA, PVDF, PTFE, PC, PVC, PP, PVDC, or a mixture of a combination of the aforementioned thermoplastic materials.

In some of the aforementioned embodiments, the thermoplastic resin material comprises PE. In some of the aforementioned embodiments, the thermoplastic resin material comprises PVDF. In some of the aforementioned embodiments, the thermoplastic resin material comprises PTFE. In some of the aforementioned embodiments, the thermoplastic resin material comprises PC. In some of the aforementioned embodiments, the thermoplastic resin material comprises PVC. In some of the aforementioned embodiments, the thermoplastic resin material comprises PP. In some of the aforementioned embodiments, the thermoplastic resin material comprises PVDC. In some of the aforementioned embodiments, the thermoplastic resin material comprises PE and PTFE.

In one embodiment, the thermoplastic resin material of transparent heat shielding composition is PE. In one embodiment, the thermoplastic resin material of the transparent heat shielding composition is PVDF. In an embodiment, the thermoplastic resin material of the transparent heat shielding composition is PTFE. In an embodiment, the thermoplastic resin material of the transparent heat shielding composition is PC. In an embodiment, the thermoplastic resin material of the transparent heat shielding composition is PVC. In an embodiment, the thermoplastic resin material of the transparent heat shielding composition is PP. In an embodiment, the thermoplastic resin material of the transparent heat shielding composition is PVDC. In one embodiment, the thermoplastic resin material of the transparent heat shielding composition is a mixture of PE and PTFE.

A compatibilizer may further added to the transparent heat shielding composition. In one embodiment, the compatibilizer is added to the transparent heat shielding composition to coat and to modify the surface of compound of formula (I). Thus, the dispersion of the compound of formula (I) within the thermoplastic resin material is increased during the process of hot-melt granulation. The increased dispersion of compound of formula (I) therefore effectively increases the shielding rate and shielding property against infrared light.

The compatibilizer may be but not limited to, EVA. The amount of compatibilizer is modified according to the amount of compound of formula (I). In one embodiment, the weight ratio of the compatibilizer to the compound of formula (I) is in a range from 0.01 to 1. In one embodiment, the weight ratio of the compatibilizer to the compound of formula (I) is in a range from 0.1 to 1.

In an embodiment, the transparent heat shielding composition comprises the thermoplastic resin material, the compound of formula (I) and the compatibilizer. The thermoplastic resin material is selected from the group consisting of PE, EVA, PVDF, PTFE, PC, PVC, PP, PVDC, and a combination thereof. The compound of formula (I) is in an amount of 0.01 wt % to 10 wt % based on the total weight of the composition. In one embodiment, the compound of formula (I) is in an amount of 0.1 wt % to 5 wt % based on the total weight of the composition. In one embodiment, the weight ratio of the compatibilizer to the compound of formula (I) is in a range from 0.01 to 1. In one embodiment, the weight ratio of the compatibilizer to the compound of formula (I) is in a range from 0.1 to 1.

In an embodiment, the transparent heat shielding composition comprises PE, the compound of formula (I) and EVA. In one embodiment, the compound of formula (I) is in an amount of 0.1 wt % to 10 wt % based on the total weight of the composition. In one embodiment, the compound of formula (I) is in an amount of 0.1 wt % to 5 wt % based on the total weight of the composition. In one embodiment, the weight ratio of EVA to the compound of formula (I) is in a range from 0.01 to 1. In one embodiment, the weight ratio of EVA to the compound of formula (I) is in range from 0.1 to 1.

In one embodiment, the transparent heat shielding composition is prepared from a mixture of the compound of formula (I) and the thermoplastic resin material. In an embodiment, the transparent heat shielding composition is prepared from a mixture of the compound of formula (I), the compatibilizer and the thermoplastic resin material.

In an embodiment, the compound of formula (I) is dispersed in a solvent, and then mixed with the thermoplastic resin material to form the transparent heat shielding composition. In one embodiment, the compound of formula (I) is ground and dispersed in a solvent, and mixed with the thermoplastic resin material to form the transparent heat shielding composition. In one embodiment, the compound of formula (I) is dispersed in a solvent, added with the compatibilizer, and then mixed with the thermoplastic resin material to form the transparent heat shielding composition. In one embodiment, the compound of formula (I) is ground and dispersed in a solvent, added with the compatibilizer and then mixed with the thermoplastic resin material to form the transparent heat shielding composition. In some of the above-mentioned embodiments, the preparation of the transparent heat shielding composition also comprises a solvent removal step. The solvent may be, but not limited to, water, methanol, ethanol, n-butanol, isopropyl alcohol, cyclohexanone, methyl ethyl ketone, methyl tertiary-butyl ketone, diethyl ether, ethylene glycol dimethyl ether, glycol ethers, glycoldiethyl ether, tetrahydrofuran (THF), propylene glycol methyl (PGMEA), ethyl-2-ethoxy ethanol acetate, ethyl 3-ethoxypropionate, and isoamyl acetate, chloroform, n-hexane, heptane, pentane, benzene, toluene, xylene, cyclohexane and a combination thereof.

Additional additives may be optionally added to the transparent heat shielding composition. For example, additives that can increase the physical properties of the thermoplastic resin material can be added to the transparent heat shielding composition. The additives may be, but not limited to, additives that are able to improve properties such as the visible light transmission rate and/or infrared rejection of the transparent heat shielding composition, anti-aging agents, anti-flow drop agents, insulation agents, anti-oxidants, ultraviolet absorbers, intensity enhancers and a combination thereof.

In one embodiment, the compound of formula (I) is mixed with the thermoplastic resin material, and then heat-melted to form the transparent heat shielding composition. In one embodiment, the compound of formula (I) is mixed with the thermoplastic resin material, and then granulated to form the transparent heat shielding composition. In one embodiment, the compound of formula (I) is dispersed in a solvent, mixed the thermoplastic resin material, and then granulated to form the transparent heat shielding composition. In one embodiment, the compound of formula (I) is dispersed in a solvent, mixed with the thermoplastic resin material, and then heat-melted to form the transparent heat shielding composition. In an embodiment, the compound of formula (I) is ground and dispersed in a solvent, mixed with the thermoplastic resin material, and then granulated to form the transparent heat shielding composition. In an embodiment, the compound of formula (I) is ground and dispersed in a solvent, mixed with the resin material, and then heat-melted to form the transparent heat shielding composition. In one embodiment, the transparent heat shielding composition can be further shaped into a film.

In one embodiment, the compound of formula (I), the compatibilizer and the thermoplastic resin material are mixed, and then heat-melted to form the transparent heat shielding composition. In an embodiment, the compound of formula (I), the compatibilizer and the thermoplastic resin material are mixed, and then granulated to form the transparent heat shielding composition. In one embodiment, the compound of formula (I) is dispersed in a solvent, added with the compatibilizer, mixed with the thermoplastic resin material, and then granulated to form the transparent heat shielding composition. In one embodiment, the compound of formula (I) is dispersed in a solvent, added with the compatibilizer, then mixed with resin material, and then heat-melted to form the transparent heat shielding composition. In one embodiment, the compound of formula (I) is ground and dispersed in a solvent, added with the compatibilizer, then mixed with the thermoplastic resin material, and then granulated to form the transparent heat shielding composition. In one embodiment, the compound of formula (I) is ground and dispersed in a solvent, added with the compatibilizer, mixed with the resin material, and then heat-melted to form the transparent heat shielding composition. In one embodiment, the transparent heat shielding composition can be further shaped into a film.

The transparent heat shielding composition may be prepared according to the following description. The details of the preparation method are shown in the following embodiments. The transparent heat shielding composition of the present disclosure may also be prepared by methods similar to the embodiments of the present disclosure. The methods and materials used in the embodiments are only intended to demonstrate the materials and methods of the present disclosure, and are not intended to limit the scope of the present disclosure.

The transparent heat shielding composition may be formed into, but not limited to, particles, films, plates and films.

In one embodiment, the transparent heat shielding composition may be further processed into a film, for example, by pressing or injection, or it may be processed into other forms. Optionally, the film thickness may be modified according to light transmission rate and heat shielding properties.

The transparent heat shielding composition may be used to form a single-layered or multi-layered heat shielding structure. In one embodiment, the heat shielding structure may comprise one or more transparent heat shielding compositions. In one embodiment, the heat shielding structure comprises one or more compounds of formula (I). The type and amount of the transparent heat shielding composition in the heat shielding structure may be optionally modified according to the required visible light transmission rate and infrared rejection. The type and amount of the compound of formula (I) in the heat shielding structure may be optionally modified according to the required light transmission rate and heat shielding properties. The film thickness may be optionally modified according to the required light transmission rate and heat shielding properties. In one embodiment, the film containing the transparent heat shielding composition has a thickness of 1 µm to 5 mm. In an embodiment, the film containing transparent heat shielding composition has a thickness of 1 µm to 3 mm. In one embodiment, the film containing transparent heat shielding composition has a thickness of 1 µm to 500 µm. The heat shielding structure may contain films of different thicknesses. The amount of compound of formula (I) can be optionally modified according to the film thickness.

The transparent heat shielding composition having the thermoplastic resin material and the compound of formula (I) may be used in any heat shielding material, which may be, but not limited to, heat shielding materials for agriculture field (for example, greenhouse translucent coating materials), heat shielding materials for automobile, and heat shielding material for building; in particular, a transparent heat shielding material.

The transparent heat shielding composition comprising the thermoplastic resin material and the compound of formula (I) has high visible light transmission rate and great infrared rejection in compared with the conventional heat shielding materials. Additionally, the transparent heat shielding composition comprising the thermoplastic resin material and the compound of formula (I) has high stability, and thus meet the requirement of industrial applicability.

The details of the present disclosure are illustrated by, but not limited to, the embodiments. Unless otherwise stated, the amounts of the components, the amounts of substances such as "%" and "part" shown in the Embodiments and Comparative Examples of the present disclosure refer to weights.

The visible light transmission rate and infrared light transmission rate mentioned in the embodiments of the present disclosure are both obtained from integral values of (spectrum intensity*sunlight intensity distribution) to wavelength. The calculation is defined according to the spectrum range defined by ISO9050 and the detection limit of the instruments. The visible light transmission between 380 nm and 780 nm and the infrared light transmission between 780 nm and 2000 nm are calculated, wherein the infrared rejection (Rir) is the result of deducting the infrared light transmission from 100%. That is, the infrared rejection is the percentage of the infrared light which cannot pass through the transparent heat shielding structures.

EMBODIMENTS

Comparative Example 1

Figure 1:
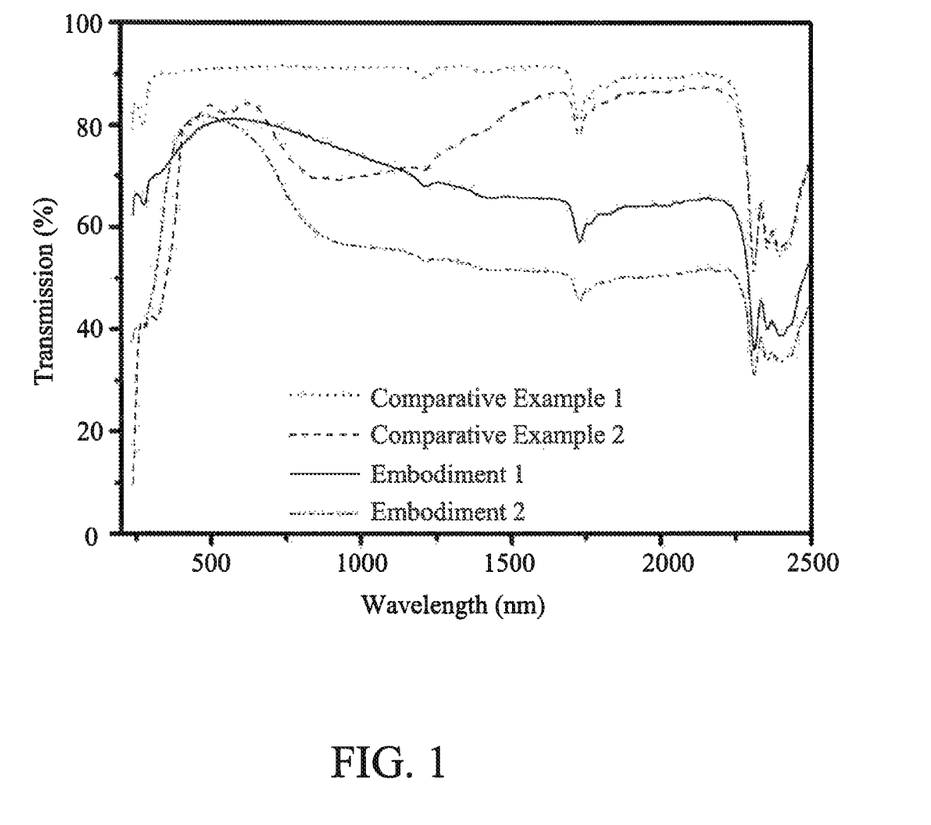
FIG. 1 shows an ultraviolet-visible-infrared light (UV-VIS-IR) spectrum of the transparent heat shielding films according to the present disclosure.

5000 g of polyethylene (PE) (produced by USI Corporation of Taiwan) was directly heat compressed into a thin film having a thickness of 100 μm. A transparent PE film was thus obtained. The ultraviolet-visible light-infrared light (UV-VIS-IR) spectrum of this film was determined, and the results are shown in Table 2 and FIG. 1. This film exhibited a heat shielding index (Tvis+Rir)*100 of 101.

Comparative Example 2

The heat shielding film used in the agricultural field shown in Table 1 (having a thickness of 110 μm) was used, and the UV-VIS-IR spectrum was determined. The results are shown in Table 2 and FIG. 1. This film exhibited a heat shielding index (Tvis+Rir)*100 of 109.

Comparative Example 3

Figure 3:
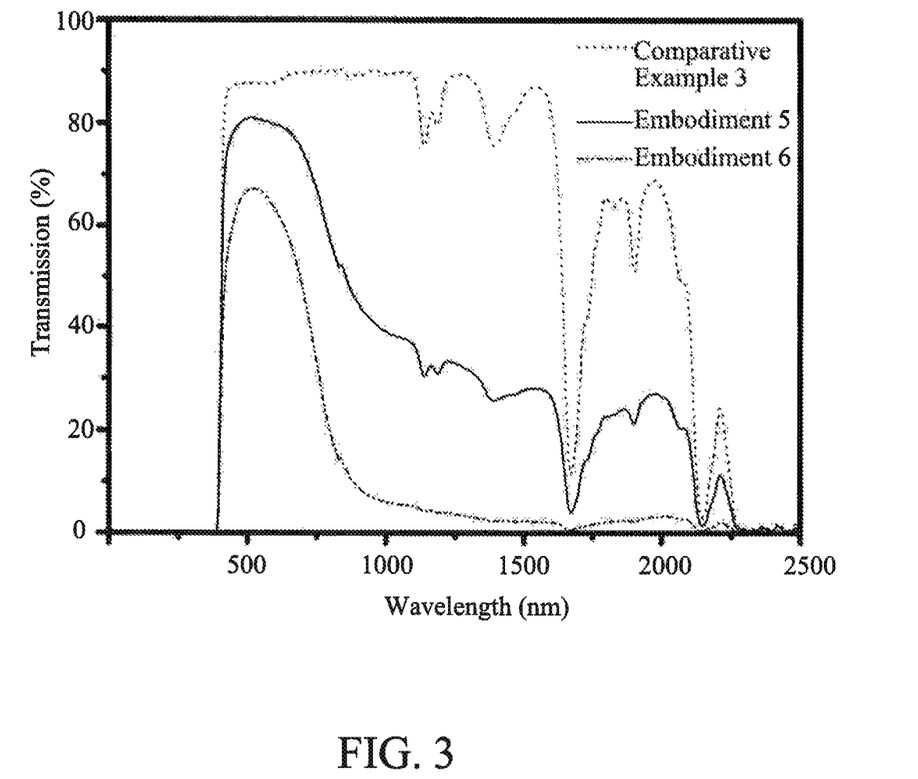
FIG. 3 shows an ultraviolet-visible-infrared light (UV-VIS-IR) spectrum of the transparent heat shielding films according to the present disclosure.

5000 g of polycarbonate (PC) particles (manufactured by Formosa Chemicals and Fibre Corporation) was directly heat compressed into a thin film having a thickness of 3 mm. A transparent PC film was thus obtained. The UV-VIS-IR spectrum of this film was determined, and the results are shown in Table 2 and FIG. 3. This film exhibited a heat shielding index (Tvis+Rir)*100 of 108.

Comparative Example 4

5000 g of polyvinylidene fluoride (PVDF) particles (produced by 3M) was directly heat compressed into a thin film having a thickness of 100 μm. A transparent PVDF thin film was thus obtained. The UV-VIS-IR spectrum of this film was determined, and the results are shown in Table 2. This film exhibited a heat shielding index (Tvis+Rir)*100 of 101.

Embodiment 1

5000 g of PE particles were placed in a container, and added with tungsten oxide powder ($Cs_{0.33}WO_{2.94}Cl_{0.02}Br_{0.04}$) under stirring using a stirring motor. The amount of tungsten oxide powder added was 1 wt % relative to the total weight of the composition. After stirring, the mixture was heat-melted and granulated to form the composite resin mother particles. The mother particles were heat compressed into a thin film having a thickness of 100 μm. A thin film of PE/anion and cation co-doped tungsten oxide was thus obtained. The UV-VIS-IR spectrum of this thin film was determined, and the results are shown in Table 2 and FIG. 1. This film exhibited a heat shielding index (Tvis+Rir)*100 of 110.

Embodiment 2

100 g of tungsten oxide powder ($Cs_{0.33}WO_{2.94}Cl_{0.02}Br_{0.04}$) was ground and dispersed in 500 g of toluene, to form an anion and cation co-doped tungsten oxide toluene solution.

Figure 2:
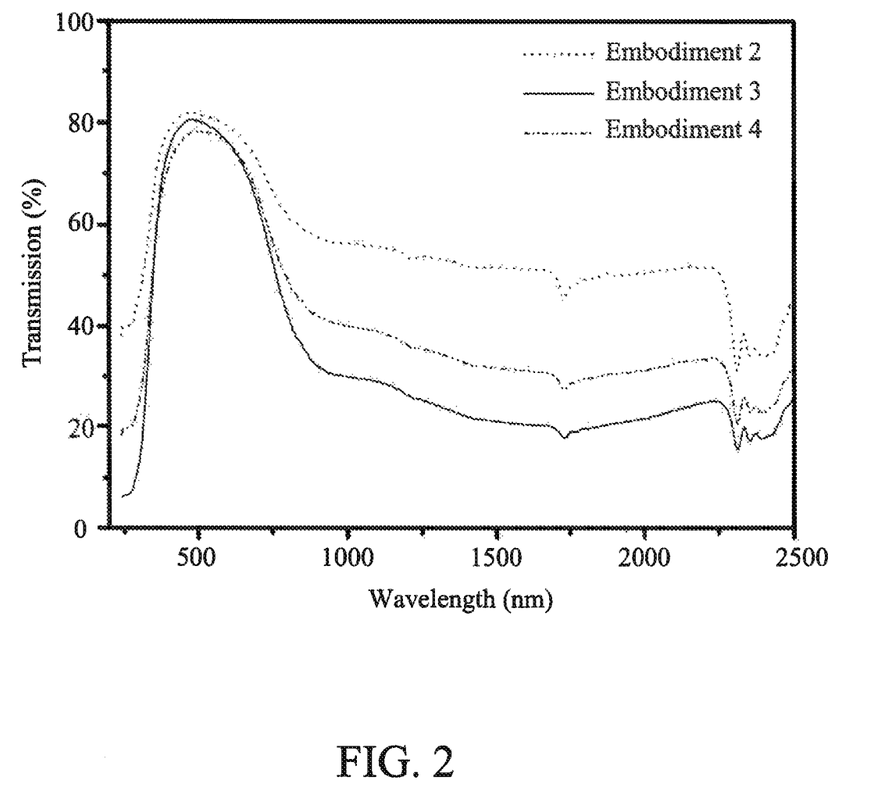
FIG. 2 shows an ultraviolet-visible-infrared light (UV-VIS-IR) spectrum of the transparent heat shielding films according to the present disclosure.

5000 g of PE particles were then placed in a container, and added with the aforesaid anion and cation co-doped tungsten oxide toluene solution under stirring using the stirring motor. The amount of tungsten oxide powder added was 1 wt % based on the total weight of the composition. After stirring, the toluene was removed in a vacuum oven, and the remaining mixed ester particles were heat melted and granulated. The heat shielding composite resin mother particles were thus obtained. These mother particles were heat compressed into a PE/anion and cation co-doped tungsten oxide composite thin film, which has a thickness of 100 μm. The UV-VIS-IR spectrum of this film was determined, and the results are shown in Table 2 and FIGS. 1 and 2. This film exhibited a heat shielding index (Tvis+Rir)*100 of 125.

Embodiment 3

100 g of tungsten oxide powder ($Cs_{0.33}WO_{2.94}Cl_{0.02}Br_{0.04}$) was ground and dispersed in 500 g of toluene, and added with 10% ethylene vinyl acetate (EVA) relative to the weight of the aforesaid powder, to enable the EVA to dissolve in toluene. Then, an anion and cation co-doped tungsten oxide toluene solution was obtained.

Then, 5000 g of PE ester particles were placed in a container, added with the EVA (produced by USI Corporation, Taiwan) under stirring with a stirring motor, and added with the anion and cation co-doped tungsten oxide toluene solution. The amount of tungsten oxide powder added was 1 wt % relative to the total weight of the composition. After stirring, the toluene was removed in a vacuum oven, and the remaining mixed ester particles were heat melted and granulated. The heat shielding composite resin mother particles were thus obtained. The mother particles were heat compressed into a thin film of PE/EVA/anion and cation co-doped tungsten oxide having a thickness of 100 μm. The UV-VIS-IR spectrum of this film was determined, and the results are shown in Table 2 and FIG. 2. This film exhibited a heat shielding index (Tvis+Rir)*100 of 149.

Embodiment 4

100 g of tungsten oxide powder ($Cs_{0.33}WO_{2.94}Cl_{0.02}Br_{0.04}$) was ground and dispersed in 500 g of toluene, and added with 20% EVA relative to the weight of aforesaid powder, to enable the EVA to dissolve in toluene. Then, an anion and cation co-doped tungsten oxide toluene solution was obtained.

Subsequently, 5000 g of PE ester particles were placed in a container, and added with the EVA and the anion and cation co-doped tungsten oxide toluene solution under stirring using stirring motor. The amount of tungsten oxide powder added was 1 wt % relative to the total weight of the composition. After stirring, the toluene was removed in a vacuum oven, and the remaining mixed ester particles were heat melted and granulated, so as to obtain the heat shielding composite resin mother particles. The mother particles were heat compressed into a thin composite film of PE/EVA/anion and cation of co-doped tungsten oxide having a thickness of 100 μm. The UV-VIS-IR spectrum of this film was determined, and the results are shown in Table 2 and FIG. 2. This film exhibited a heat shielding index (Tvis+Rir)*100 of 138.

Embodiment 5

100 g of tungsten oxide powder ($Cs_{0.33}WO_{2.9}Cl_{0.1}$) was ground and dispersed in 500 g of isopropanol. The anion and cation co-doped tungsten oxide isopropanol solution was obtained.

Subsequently, 5000 g of PC ester particles (produced by Formosa Chemicals and Fibre Corporation, Taiwan) were placed in a container, and added with the aforesaid anion and cation co-doped tungsten oxide isopropyl alcohol solution under stirring using a stirring motor. The amount of tungsten oxide powder added was 0.1 wt % relative to the total weight of the composition. After stirring, the isopropanol was removed in a vacuum oven, and the remaining mixed ester particles were heat melted and granulated to form the heat shielding composite resin mother particles. The mother particles were heat compressed into a thin composite film of PC/anion and cation co-doped tungsten oxide having a thickness of 1 mm. The UV-VIS-IR spectrum of this film was determined, and the results are shown in Table 2 and FIG. 3 This film exhibited a heat shielding index (Tvis+Rir)*100 of 144.

Embodiment 6

100 g of tungsten oxide powder ($Cs_{0.33}WO_{2.9}Cl_{0.1}$) was ground and dispersed in 500 g of isopropanol, and thus the anion and cation co-doped tungsten oxide isopropanol solution was obtained.

5000 g of PC ester particles (produced by Formosa Chemicals and Fibre Corporation, Taiwan) were placed in a container, and added with the aforesaid anion and cation co-doped tungsten oxide isopropanol solution under stirring using a stirring motor. The amount of tungsten oxide powder added was 0.1 wt % relative to the total weight of the composition. After stirring, the isopropanol was removed in a vacuum oven, and the remaining mixed ester particles were heat melted and granulated to form the heat shielding composite resin mother particles. The mother particles were heat compressed into a thin composite film of PC/anion and cation co-doped tungsten oxide having a thickness of 3 mm. The UV-VIS-IR spectrum of this film was determined, and the results are shown in Table 2 and FIG. 3 This film exhibited a heat shielding index (Tvis+Rir)*100 of 158.

Embodiment 7

100 g of tungsten oxide powder ($Rb_{0.33}WO_{2.9}Br_{0.1}$) was ground and dispersed in 500 g of toluene, and thus the anion and cation co-doped tungsten oxide toluene solution was obtained.

5000 g of polyvinylidene fluoride (PVDF) particles (produced by 3M) were placed in a container, and added with the aforesaid anion and cation co-doped tungsten oxide toluene solution under stirring using a stirring motor. The amount of tungsten oxide powder added was 1 wt % relative to the total weight of the composition. After stirring, the toluene was removed in a vacuum oven, and the remaining mixed ester particles were heat incited and granulated to form the heat shielding composite resin mother particles. The mother particles were heat compressed into a thin composite film of PVDF/anion and cation co-doped tungsten oxide having a thickness of 100 μm. The UV-VIS-IR spectrum of this film was determined, and the results are shown in Table 2. This film exhibited a heat shielding index (Tvis+Rir)*100 of 122.

Embodiment 8

100 g of tungsten oxide powder ($K_{0.33}WO_{2.9}Cl_{0.05}Br_{0.05}$) was ground and dispersed in 500 g of toluene, and thus the anion and cation co-doped tungsten oxide toluene solution was obtained.

5000 g of polypropylene (PP) particles (produced by Formosa Chemicals and Fibre Corporation, Taiwan) were placed in a container, and added with the aforesaid anion and cation co-doped tungsten oxide toluene solution under stirring using a stirring motor. The amount of tungsten oxide powder added was 1 wt % relative to the total weight of the composition. After stirring, the toluene was removed in a vacuum oven, and the remaining mixed ester particles were heat melted and granulated to form the heat shielding composite resin mother particles. The mother particles were heat compressed into a thin composite film of PP/anion and cation co-doped tungsten oxide having a thickness of 100 μm. The UV-VIS-IR spectrum of this film was determined, and the results are shown in Table 2. This film exhibited a heat shielding index (Tvis+Rir)*100 of 132.

Embodiment 9

100 g of tungsten oxide powder ($K_{0.5}WO_{2.9}Br_{0.1}$) was ground and dispersed in 500 g of toluene, and the anion and cation co-doped tungsten oxide toluene solution was thus obtained.

5000 g of polyvinyl chloride (PVC) particles (produced by Formosa Plastics Corporation, Taiwan) were placed in a container, and added with the aforesaid anion and cation co-doped tungsten oxide toluene solution under stirring using a stirring motor. The amount of tungsten oxide powder added was 1 wt % relative to the total weight of the composition. After stirring, the toluene was removed in a vacuum oven, and the remaining mixed ester particles were heat melted and granulated to form the heat shielding composite resin mother particles. The mother particles were heat compressed into a thin composite film of PVC/anion and cation co-doped tungsten oxide having a thickness of 100 μm. The UV-VIS-IR spectrum of this film was determined, and the results are shown in Table 2. This film exhibited a heat shielding index (Tvis+Rir)*100 of 142.

Embodiment 10

100 g of tungsten oxide powder ($Na_{0.5}WO_{2.9}F_{0.1}$) was ground and dispersed in 500 g of toluene, and thus the anion and cation co-doped tungsten oxide toluene solution was obtained.

5000 g of polyvinylidene chloride (PVDC) particles (produced by Formosa Plastics Corporation, Taiwan) were placed in a container, and added with the aforesaid anion and cation co-doped tungsten oxide toluene solution under stirring using a stirring motor. The amount of tungsten oxide powder added was 1 wt % relative to the total weight of the composition. After stirring, the toluene was removed in a vacuum oven, and the remaining mixed ester particles were heat melted and granulated to form the heat shielding composite resin mother particles. The mother particles were heat compressed into a thin composite film of PVDC/anion and cation co-doped tungsten oxide having a thickness of 100 μm. The UV-VIS-IR spectrum of this film was determined, and the results are shown in Table 2. This film exhibited a heat shielding index (Tvis+Rir)*100 of 122.

Embodiment 11

100 g of tungsten oxide powder ($Na_{0.3}Li_{0.2}WO_{2.9}Cl_{0.1}$) was ground and dispersed in 500 g of toluene, and thus the anion and cation co-doped tungsten oxide toluene solution was obtained.

2500 g of polytetrafluoroethene (PTFE) particles (produced by Muybien Enterprise Co. Ltd., Taiwan) and 2500 g of PE particles (produced by USI Corporation, Taiwan) were placed in a container, and stirred well using a stirring motor. Subsequently, the aforesaid anion and cation co-doped tungsten oxide toluene solution was added to the container under stirring using the stirring motor. The amount of tungsten oxide powder added was 1 wt % relative to the total weight of the composition. After stirring, the toluene was removed in a vacuum oven, and the remaining mixed ester particles were heat melted and granulated to form the heat shielding composite resin mother particles. The mother particles were heat compressed into a thin composite film of PTFE/PE/anion and cation co-doped tungsten oxide having a thickness of 100 μm. The UV-VIS-IR spectrum of this film was determined, and the results are shown in Table 2. This film exhibited a heat shielding index (Tvis+Rir)*100 of 126.

Embodiment 12

500 g of tungsten oxide powder ($Cs_{0.33}WO_{2.94}Cl_{0.02}Br_{0.04}$) was ground and dispersed in 2500 g of toluene, and added with 100% of EVA relative to the weight of the powder. Thus, the anion and cation co-doped tungsten oxide toluene solution was obtained.

5000 g of PE particles were placed in a container, added with the aforesaid anion and cation co-doped tungsten oxide toluene solution under stirring using a stirring motor. The amount of tungsten oxide powder added was 5 wt % relative to the total weight of the composition. After stirring, the toluene was removed in a vacuum oven, and the remaining mixed ester particles were heat melted and granulated to form the heat shielding composite resin mother particles. The mother particles were heat compressed into a thin composite film of PE/EVA/anion and cation co-doped tungsten oxide having a thickness of 20 μm. The UV-VIS-IR spectrum of this film was determined, and the results are shown in Table 2. This film exhibited a heat shielding index (Tvis+Rir)*100 of 146.

TABLE 2

| Embodiment | Visible light transmission rate (%); Tvis | Infrared rejection (%); Rir | Heat shielding index (Tvis + Rir)*100 |
|---|---|---|---|
| Comparative Example 1 | 91 | 10 | 101 |
| Comparative Example 2 | 83 | 26 | 109 |
| Comparative Example 3 | 88 | 20 | 108 |
| Comparative Example 4 | 89 | 12 | 101 |
| Embodiment 1 | 81 | 29 | 110 |
| Embodiment 2 | 80 | 45 | 125 |
| Embodiment 3 | 78 | 71 | 149 |
| Embodiment 4 | 77 | 61 | 138 |
| Embodiment 5 | 80 | 64 | 144 |
| Embodiment 6 | 65 | 93 | 158 |
| Embodiment 7 | 77 | 45 | 122 |
| Embodiment 8 | 68 | 64 | 132 |
| Embodiment 9 | 83 | 59 | 142 |
| Embodiment 10 | 77 | 45 | 122 |
| Embodiment 11 | 66 | 60 | 126 |
| Embodiment 12 | 75 | 71 | 146 |

As demonstrated in Table 2, it is clear that the products containing the compound of formula (I) of Embodiments 1-12 have a high visible light transmission rate, a higher infrared rejection, and a higher heat shielding index in comparison with Comparative Examples 1-4.

Moreover, in comparison to Comparative Examples 1 and 2, the PE product containing the compound of formula (I) in Embodiments 1-4 and 12 clearly have a higher infrared rejection and a higher heat shielding index. As such, it is clear that the transparent heat shielding composition containing the compound of formula (I) has high light transmission rate and a high shielding rate.

Further, if compared to Embodiment 2, it is clear from Embodiments 3, 4 and 12 that the compatibilizer (EVA) can coat and modify the surface of nano heat shielding powder (compound of formula (I)). Such surface modification causes increased dispersion of heat shielding powder in the resin material during the heat melt granulation process, so as to effectively increase the infrared rejection and heat shielding ability at the nearly visible light transmission rate.

TABLE 1

| Embodiment | Resin material (wt %) | Compatibilizer (wt %) | Filler (wt %) |
|---|---|---|---|
| Comparative Example 1 | PE (100) | x | x |
| Comparative Example 2 | PE (95) | x | Mica coated titanium dioxide (5) |
| Comparative Example 3 | PC (100) | x | x |
| Comparative Example 4 | PVDF (100) | x | x |
| Embodiment 1 | PE (99) | x | $Cs_{0.33}WO_{2.94}Cl_{0.02}Br_{0.04}$ (1) |
| Embodiment 2 | PE (99) | x | $Cs_{0.33}WO_{2.94}Cl_{0.02}Br_{0.04}$ (1) |
| Embodiment 3 | PE (98.9) | EVA (0.1) | $Cs_{0.33}WO_{2.94}Cl_{0.02}Br_{0.04}$ (1) |
| Embodiment 4 | PE (98.8) | EVA (0.2) | $Cs_{0.33}WO_{2.94}Cl_{0.02}Br_{0.04}$ (1) |
| Embodiment 5 | PC (99.9) | x | $Cs_{0.33}WO_{2.9}Cl_{0.10}$ (0.1) |
| Embodiment 6 | PC (99.9) | x | $Cs_{0.33}WO_{2.9}Cl_{0.10}$ (0.1) |
| Embodiment 7 | PVDF (99) | x | $Rb_{0.33}WO_{2.9}Br_{0.1}$ (1) |
| Embodiment 8 | PP (99) | x | $K_{0.33}WO_{2.9}Br_{0.05}Cl_{0.05}$ (1) |
| Embodiment 9 | PVC (99) | x | $K_{0.5}WO_{2.9}Br_{0.1}$ (1) |
| Embodiment 10 | PVDC (99) | x | $Na_{0.5}WO_{2.9}F_{0.1}$ (1) |
| Embodiment 11 | PE (49.5) PTFE (49.5) | x | $Na_{0.3}Li_{0.2}WO_{2.9}Cl_{0.1}$ (1) |
| Embodiment 12 | PE (90) | EVA (5) | $Cs_{0.33}WO_{2.94}Cl_{0.02}Br_{0.04}$ (5) |

The transparent heat shielding composition comprising the thermoplastic resin material and the aforesaid compound of formula (I) has high visible light transmission rate and high infrared rejection, and thus solves the problem of conventional heat shielding materials. Further, the transparent heat shielding composition comprising the thermoplastic resin material and compound of formula (I) has high stability, and thus meets the requirement of industrial applicability.

The embodiments above are used only to illustrate the transparent heat shielding composition and its preparation process of the present disclosure, and they should not be construed as to limit the scope of the present disclosure in any way. The above embodiments can be modified by persons skilled in the art without departing from the scope of the present disclosure as defined in the following appended claims.

What is claimed is:

1. A transparent heat shielding composition, comprising a mixture of a thermoplastic resin material and a compound of formula (I):

$$M_xWO_{3-y}A_y \qquad (I),$$

wherein M is an alkali metal, W is tungsten, O is oxygen, A is halogen, $0<x\leq1$, $0<y\leq0.5$, and wherein the thermoplastic resin material is at least one selected from the group consisting of polyethylene, ethylene vinyl acetate, poly(ethylene-ethylene vinyl acetate), polyvinyl chloride, polypropylene, polyvinyl alcohol and polyvinylidene chloride.

2. The transparent heat shielding composition of claim 1, further comprising a compatibilizer, wherein the compatibilizer is ethylene vinyl acetate.

3. The transparent heat shielding composition of claim 1, wherein the thermoplastic resin material is polyethylene.

4. The transparent heat shielding composition of claim 2, wherein a weight ratio of the compatibilizer to the compound of formula (I) is in a range from 0.01 to 1.

5. The transparent heat shielding composition of claim 1, wherein M is one selected from the group consisting of Li, Na, K, Rb and Cs.

6. The transparent heat shielding composition of claim 1, wherein A is one selected from the group consisting of F, Cl, Br and I.

7. The transparent heat shielding composition of claim 1, wherein the compound of formula (I) is in an amount from 0.01 wt % to 10 wt % based on the total weight of the transparent heat shielding composition.

8. The transparent heat shielding composition of claim 1, wherein the composition is formed into a particle shape, a film shape, a plate shape or a thin film shape.

9. The transparent heat shielding composition of claim 1, wherein the compound of formula (I) is dispersed in a solvent, and mixed with the thermoplastic resin material.

10. The transparent heat shielding composition of claim 2, wherein the compound of formula (I) is dispersed in a solvent, added with the compatibilizer, and then mixed with the thermoplastic resin material.

* * * * *